United States Patent [19]

Miki et al.

[11] Patent Number: 4,506,590

[45] Date of Patent: Mar. 26, 1985

[54] HYDRAULIC ROTARY ACTUATOR

[75] Inventors: Masayuki Miki, Otsu; Tetsuya Tanigaki, Kyoto, both of Japan

[73] Assignee: Shimadzu Coporation, Kyoto, Japan

[21] Appl. No.: 515,604

[22] Filed: Jul. 21, 1983

[30] Foreign Application Priority Data

| Jul. 28, 1982 | [JP] | Japan | 57-132655 |
| Jul. 30, 1982 | [JP] | Japan | 57-134192 |
| Sep. 24, 1982 | [JP] | Japan | 57-166361 |

[51] Int. Cl.³ .................. F15B 21/02; F01B 1/06; F01B 13/06
[52] U.S. Cl. ........................ 91/35; 91/491; 192/3 N; 192/30 W
[58] Field of Search ............ 92/5 R; 91/39, 491, 91/493–496; 192/3 N, 30 W

[56] References Cited

U.S. PATENT DOCUMENTS

| 3,088,333 | 5/1963 | Musser | 74/640 |
| 3,364,361 | 1/1968 | Burger | 92/5 R |
| 3,403,365 | 9/1968 | Richards | 92/5 R |
| 3,589,243 | 6/1971 | Bowman | 91/495 |
| 3,589,482 | 6/1971 | Weston, Jr. | 192/3 N |
| 3,737,014 | 6/1973 | Dalrymple | 74/640 |
| 3,762,488 | 10/1973 | Dammon | 91/494 |
| 3,943,826 | 3/1976 | Kita | 91/488 |
| 4,068,560 | 1/1978 | Orloff | 91/491 |
| 4,340,133 | 7/1982 | Blersch | 192/30 W |

FOREIGN PATENT DOCUMENTS

2731486  1/1979  Fed. Rep. of Germany ........ 74/640

*Primary Examiner*—William L. Freeh
*Attorney, Agent, or Firm*—Fidelman, Wolffe & Waldron

[57] ABSTRACT

A hydraulic rotary actuator which comprises a harmonic drive and a hydraulic motor completely enclosed in the casing of the harmonic drive so that the rotation of the motor is taken out through an output shaft fixed to the drive at a reduced speed. In the casing of the harmonic drive there are provided an electromagnetic brake which acts on the motor, means for increasing the performance of the magnetic brake, means for magnetically shielding the supporting shaft of the hydraulic motor, and means for detecting the angular position of the motor and that of the output shaft relative to the supporting shaft of the motor.

11 Claims, 10 Drawing Figures

HYDRAULIC ROTARY ACTUATOR

BACKGROUND OF THE INVENTION

This invention relates to a hydraulic rotary actuator for use in industrial robots and the like.

Generally, the actuator to be incorporated in a joint of an articulated robot for industrial use must be compact in size, light in weight, quick in response and capable of high speed operation with a high output torque, and have a high degree of accuracy and precision in determination of position.

In recent years there have been proposed various types of hydraulic actuators for use in industrial robots. One known actuator comprises a harmonic drive or speed changer in combination with a hydraulic motor. The harmonic drive comprises a rigid circular spline having a cup-shaped casing and internal teeth, and a flexible spline having a thin-walled cup-shaped casing of flexible material and external teeth, the casing of the flexible spline being disposed within the casing of the rigid circular spline to define a chamber, in which a wave generator is arranged so as to act on the flexible spline to cause selective and partial engagement of the external and internal teeth of the two splines. The hydraulic motor is disposed in the chamber of the harmonic drive, with the wave generator being mounted on the rotatable casing of the hydraulic motor.

Indeed, the actuator of the above-mentioned known construction is not only capable of producing a high output torque since the output speed of the hydraulic motor is reduced by the harmonic drive, but also it can be made compact in size and light in weight since the hydraulic motor is completely enclosed in the casing of the harmonic drive and the wave generator of the harmonic drive is mounted on the casing of the hydraulic motor. However, the above advantages are not sufficient for the conventional actuator to be used effectively in an articulated robot.

To work effectively as a drive for, say, an industrial robot, the actuator must be able to move the robot arm to, or stop it at, a required position against the force of inertia at a high speed and with a high degree of accuracy and precision. When an accident or disorder such as power failure has happened, the robot must be instantly stopped for safety, and when the accident or disorder has been removed, the original position of the robot must be restored as quickly and accurately as possible.

To meet the requirements the actuator must be provided with a detector capable of detecting the position of the robot arm with a high degree of accuracy and precision, and a brake capable of stopping the arm quickly and exactly at a required position against the force of inertia. It has been proposed to provide the actuator with an electromagnetic brake enclosed in the previously mentioned chamber of the harmonic drive so as to act on the hydraulic motor. However, since the chamber is a space defined by various mechanical parts or members of magnetic material, the magnetic flux produced by the coil of the electromagnetic brake tends to be dispersed, with resulting decrease in the effective magnetic force required for proper operation of the brake. To provide a sufficient magnetic force, the brake must be provided with a larger electromagnetic coil, which would occupy a larger space with resulting increase in the size of the actuator.

The magnetic field produced by the coil of the electromagnetic brake magnetizes the various members about the coil, particularly, the supporting shaft of the hydraulic motor. When magnetized, the shaft tends to attract particles or dust of iron or the like contained in the working fluid for the hydraulic motor, so that the particles or dust cause damage to the shaft or the associated members.

For accurate and precise positioning of the robot arm, it has been proposed to provide the actuator with a first and a second rotation detector at the input and output sides, respectively. In the prior art arrangement, however, the two detectors are provided outside the casing of the actuator, so that it is difficult to make the actuator compact, and a feedback gearing must be provided for transmission of the angular position of the output shaft to the detectors, so that the backlash of the gears tends to deteriorate the accuracy and precision of the detecting operation of the detectors.

Accordingly, the primary object of the invention is to provide a hydraulic rotary actuator which comprises a hydraulic motor and a harmonic drive having an interior chamber in which the hydraulic motor is completely enclosed in such a particular relation to the harmonic drive as to eliminate the disadvantages of the conventional devices.

Another object of the invention is to provide such a hydraulic rotary actuator as aforesaid which is compact in size, light in weight, quick in response and operation, and has a high output torque and a high degree of accuracy and precision in operation.

Another object of the invention is to provide such a hydraulic rotary actuator as aforesaid which is provided with an electromagnetic brake for the hydraulic motor and means for increasing the performance of the brake.

Another object of the invention is to provide such a hydraulic rotary actuator which is provided with a first and a second rotation detector enclosed in the chamber of the harmonic drive and arranged in a particular relation to the hydraulic motor and the harmonic drive so that quick, accurate and precise positioning can be effected.

The invention will be described in detail with reference to the accompanying drawing.

SUMMARY OF THE INVENTION

Figure 1:
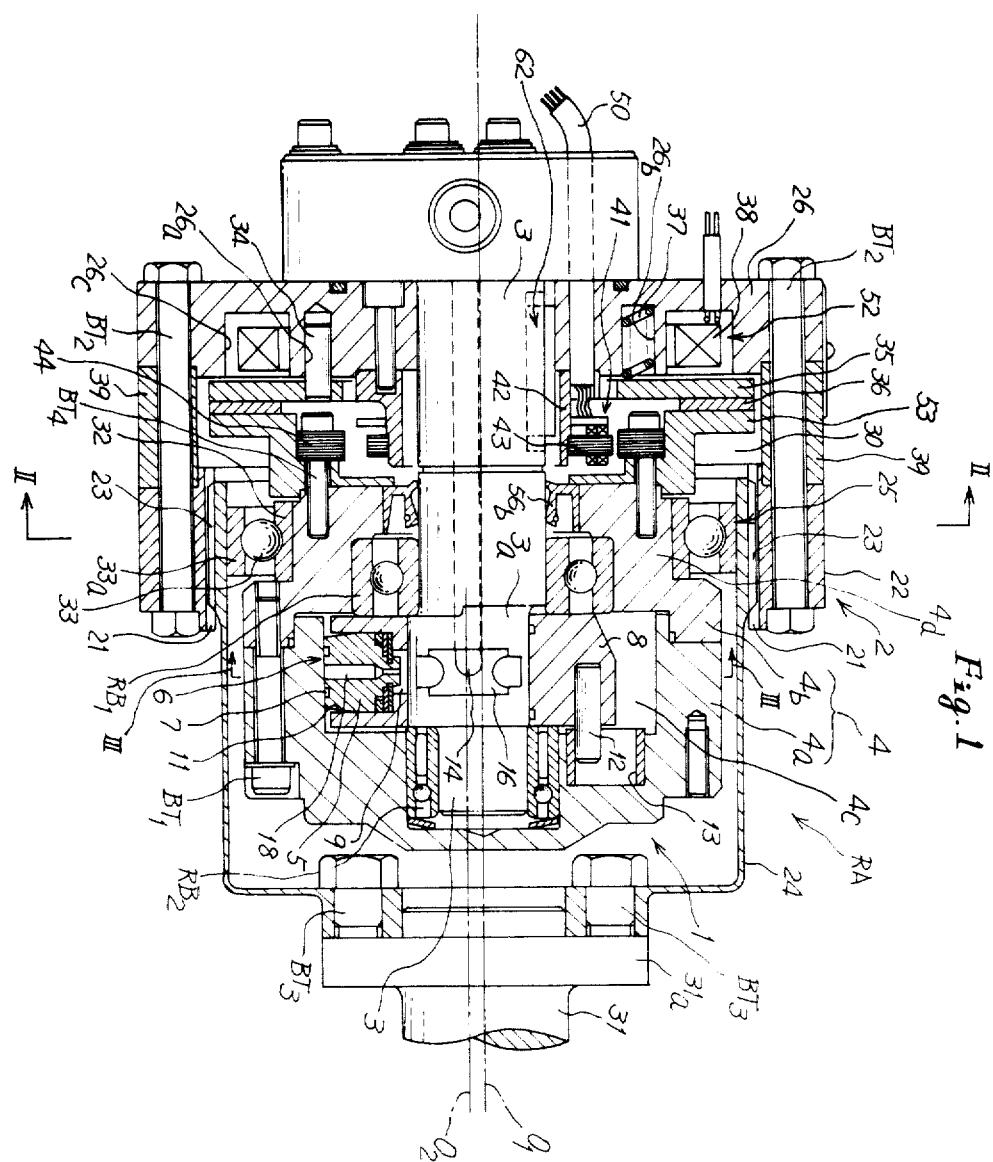
FIG. 1 is a vertical sectional view of one embodiment of the invention.
Figure 2:
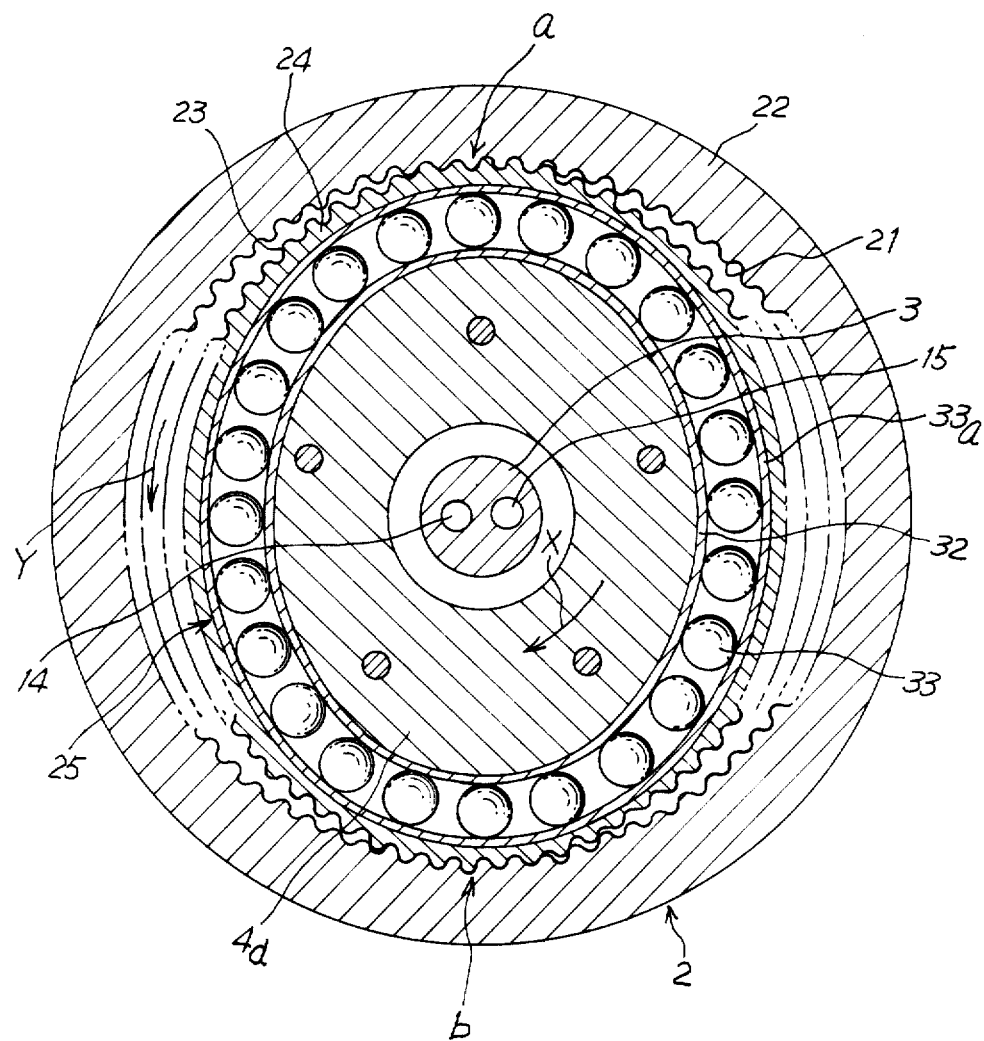
FIG. 2 is a transverse sectional view taken on line II—II in FIG. 1.

Briefly stated, the hydraulic rotary actuator of the invention comprises a harmonic drive and a hydraulic motor completely enclosed in the casing of the harmonic drive so as to be rotatable on a fixed supporting shaft. The harmonic drive comprises a generally hollow cylindrical rigid circular spline closed at one axial end by a supporting disk member and open at the opposite axial end, with internal teeth formed on the open axial end portion thereof, and a generally cup-shaped flexible spline having external teeth on the open end portion thereof and an output shaft fixed to the opposite axial end. The two splines are combined in such a manner that the flexible spline has its open end portion inserted into the open end portion of the rigid circular spline so as to define a chamber, in which the hydraulic motor is enclosed, with a wave generator so mounted on the casing of the hydraulic motor as to act on the flexible spline to cause partial engagement of the external teeth thereof with the internal teeth of the rigid circular spline.

As the hydraulic motor is rotated, the wave generator causes the points of engagement of the internal and external teeth of the two splines to be displaced circumferentially so that the flexible spline and consequently the output shaft thereof are rotated at a reduced speed which is determined in accordance with the difference between the numbers of the internal and external teeth of the two splines.

In the above-mentioned chamber of the harmonic drive there are provided an electromagnetic brake so arranged as to act on the hydraulic motor and also means for detecting the rotational position and speed of the hydraulic motor and that of the output shaft of the actuator relative to the supporting shaft of the motor.

In a preferred embodiment of the invention, the actuator is provided with means for increasing the performance of the electromagnetic brake and also a magnetic shield for protection of the supporting shaft and other component parts of the actuator against magnetization which would otherwise be caused by the magnetic field produced by the coil of the electromagnetic brake.

DESCRIPTION OF THE PREFERRED EMBODIMENTS

Referring to FIGS. 1 to 4, there is shown a hydraulic rotary actuator generally designated by RA which comprises a hydraulic motor 1 and a harmonic drive or speed changer 2 combined with the motor in a particular manner to be described later in detail.

The hydraulic motor 1 comprises a stationary supporting shaft 3 having a portion $3a$ the axis $O_2$ of which is eccentric with respect to the axis $O_1$ of the shaft 3, and a casing 4 supported by the shaft 3 so as to be rotatable about the axis $O_1$ thereof.

The casing 4 comprises a generally cup-shaped body $4a$ and a lid member $4b$ secured to the body by means of bolts, one of which is shown at $BT_1$, so as to close the axial opening of the body $4a$ thereby to define an enclosed chamber about the eccentric portion $3a$ of the shaft 3.

The shaft 3 extends through the lid member $4b$ coaxially therewith, which is rotatably supported by a radial ball bearing $RB_1$ on the shaft 3 at the left-hand side of and adjacent to the eccentric portion $3a$ of the shaft, while the right-hand end portion of the shaft supports the cup-shaped body $4a$ of the casing by a radial bearing $RB_2$.

Figure 3:
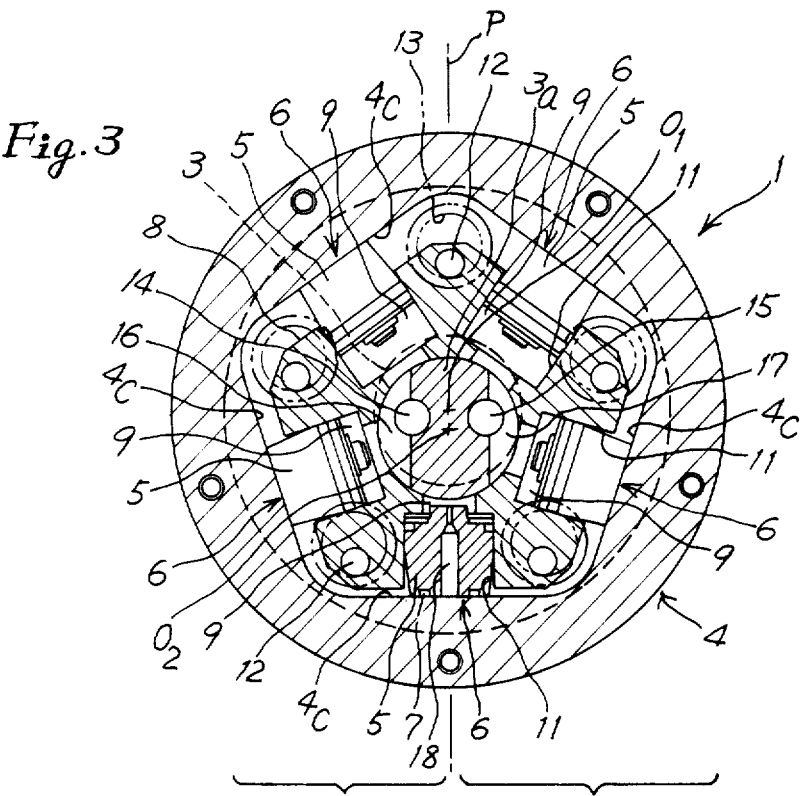
FIG. 3 is a transverse sectional view taken on line III—III in FIG. 1.

The inner circumferential surface of the casing 4 is composed of an odd number, say, five flat surface sections $4c$ circumferentially arranged at equal angular intervals, so that the chamber inside the casing 4 is generally pentagonal in transverse section as shown in FIG. 3. In the chamber there are provided five pistons 5 each at a position corresponding to one of the flat surface sections $4c$ of the casing 4.

Each piston 5 is arranged radially about the eccentric axis $O_2$ and has an outer flat end face in close contact with the corresponding one of the flat inner surface sections $4c$ of the casing 4, with a static pressure bearing 6 interposed therebetween. In particular, in the outer flat end face of each piston 5 there is recessed a pressure pocket 7, into which pressurized fluid is introduced in a manner to be described later so as to provide the above-mentioned static pressure bearing 6.

Inside the chamber of the casing 4 there is provided a cylinder block 8 rotatably fitted on the eccentric portion $3a$ of the supporting shaft 3. The cylinder block 8 is formed with five cylinder bores 11 radially directed about the eccentric axis $O_2$ of the shaft portion $3a$ and circumferentially arranged at equal angular intervals. Each of the pistons 5 is slidably fitted in one of the cylinder bores 11, with a space 9 being left in each of the cylinder bores radially inwardly of the inner end face of the piston. As the casing 4 is rotated, the spaces 9 vary in volume as will be described later in detail.

The cylinder block 8 is provided with a plurality, say, five pins 12 extending axially from the right-hand axial end face of the block 8 so as to engage in corresponding five holes 13 formed in the opposed inner axial end face of the body portion $4b$ of the casing 4 thereby to prevent rotation of the cylinder block 8 relative to the casing 4 beyond a predetermined angle. In other words, the rotation of the casing 4 is followed by that of the cylinder block 8.

Suppose that the interior chamber of the casing 4 is divided into two areas A and B by an imaginary straight line P crossing the axis $O_1$ of the supporting shaft 3 and the axis $O_2$ of the eccentric portion $3a$ of the shaft 3 as shown in FIG. 3. The eccentric portion $3a$ of the shaft 3 is formed in the periphery thereof with a pair of diametrically opposite pressure pockets 16 and 17 existing in the first and second areas A and B, respectively. The spaces 9 in the cylinder bores 11 below the pistons 5 existing in the first area A communicate through the first pressure pocket 16 with a first fluid passage 14 while the spaces 9 in the cylinder bores 11 below the pistons in the second area B communicate through the second pressure pocket 17 with a second fluid passage 15.

The first and second fluid passages 14 and 15 are formed axially in the supporting shaft 3 so as to communicate the pressure pockets 16 and 17 with fluid inlet-outlet ports, not shown, provided at the left-hand end of the shaft 3. Each of the pistons 5 is formed with an axial bore 18, through which hydraulic pressure in the space 9 below the piston is transferred to the pressure pocket 7 of the static pressure bearing 6 between the outer flat end face of the piston and the opposite flat inner surface section $4c$ of the casing 4.

The harmonic drive 2 comprises a rigid circular spline 22, a flexible spline 24 coaxially arranged within the rigid circular spline 22 and a wave generator 25 arranged coaxially within the flexible spline 24. The rigid circular spline 22 is made of a suitable rigid material and has internal teeth 21 formed on the inner circumferential surface thereof. The rigid circular spline 22 is secured by bolts $BT_2$ to a stationary supporting disk 26, with an annular member 39 of nonmagnetic material being interposed between the rigid circular spline 22 and the supporting disk 26.

The flexible spline 24 comprises a generally cup-shaped member made of a suitable resiliently flexible material and has external teeth 23 formed on the periphery of the open axial end portion thereof. The external teeth 23 on the flexible spline 24 are of the same pitch as the internal teeth 21 on the rigid circular spline 22, and the number of the external teeth 23 is a little smaller than that of the internal teeth 21. The flexible spline 24 has its open axial end portion arranged coaxially within the rigid circular spline 22 so that the teeth 21 and 23 on the two splines engage in a particular manner to be described presently.

An output shaft 31 has its base 31a fixed by bolts $BT_3$ to the axial end of the flexible spline 24 opposite to the open end thereof and extends in axial alignment with the supporting shaft 3.

The rigid circular spline 22, the intermediate ring 39 and the axial end disk 26 assembled in the previously mentioned manner and the flexible spline 24 combined with the assembly define an interior chamber 30, in which the hydraulic motor 1, the wave generator 25 and other component parts associated therewith are arranged as will be described below.

In particular, the supporting shaft 3 of the hydraulic motor 1 is secured to one axial end to the center of the supporting disk 26 of the harmonic drive 2, and the motor casing 4 rotatably fitted on the opposite end portion of the shaft 3 is disposed in the flexible spline 24, with the wave generator 25 being interposed between the motor casing 4 and the flexible spline 24 in such an operative relation that the wave generator 25 resiliently transforms the externally toothed portion of the flexible spline 24 into an ellipse in cross section thereby to bring the internal and external teeth 21 and 23 on the rigid and flexible splines 22 and 24 into mutual engagement at two diametrically spaced points a and b on the major axis of the ellipse, with intermediate points at which the teeth are out of mesh, and also to cause the two points a and b to move circumferentially as the motor rotates.

To this end, the wave generator 25 comprises a ball bearing which has an outer race 33a of a suitable resiliently flexible material and an inner race or cam 32 of a suitable rigid material, with balls 33 being interposed between the inner and outer races. The outer race 33a is fitted internally in the externally toothed axial end portion of the flexible spline 24 so that they are deflectable as an integral member, and the inner race or cam 32 is fitted externally on a reduced-diameter portion 4d of the lid member 4b of the motor casing 4 for simultaneous rotation therewith about the axis $0_1$. The portion 4d of the motor casing 4 is elliptical in cross section and so is the inner race or cam 32 thereon.

In the interior chamber 30 of the actuator there is provided an electromagnetic brake 52 for stopping the rotation of the casing 4 of the hydraulic motor 1 relative to the supporting disk 26 of the harmonic drive 2. An annular brake shoe 53 is fixed to the axial end face of the lid member 4b of the motor casing 4. Facing the brake shoe 53 is an armature 35 of a magnetic material supported by the supporting disk 26 in such a manner that the armature is not rotatable but axially movable relative to the disk 26. In particular, the armature 35 has a plurality of guide pins 34 projecting axially from one side thereof into slidable engagement in corresponding axial holes 26a formed in the inner axial end face of the disk 26 opposite to the armature 35. An annular brake lining 36 is fixed to the armature so as to face the brake shoe 53.

A plurality of compression coil springs 37 received in circumferentially arranged holes 26b formed in the inner axial end face of the supporting disk 26 urge the armature 35 and the brake lining 36 thereon against the brake shoe 53 thereby to brake the motor casing 4. In the inner axial end face of the supporting disk 26 there is formed an annular groove 26c in which an electromagnetic coil 38 is disposed so as to face the rear surface of the armature 35. When energized, the coil 38 attracts the armature 35 against the force of the springs 37 to separate the brake lining 36 away from the brake shoe 53 thereby to release the brake on the motor casing 4.

The previously mentioned intermediate ring 39 made of nonmagnetic material such as stainless steel serves to prevent the magnetic flux produced by the electromagnetic coil 38 from passing through the supporting disk 26 to leak into the circular spline 22, thereby to increase the effective magnetic flux acting on the armature 35.

In the interior chamber 30 of the harmonic drive 2 there is also provided a detector 41 of a magnetic type for detecting the angular position and speed of the motor casing 4 relative to the supporting shaft 3. The structure and operation of the detector 41 will be described later in detail with reference to FIGS. 7, 9 and 10.

Figure 4:
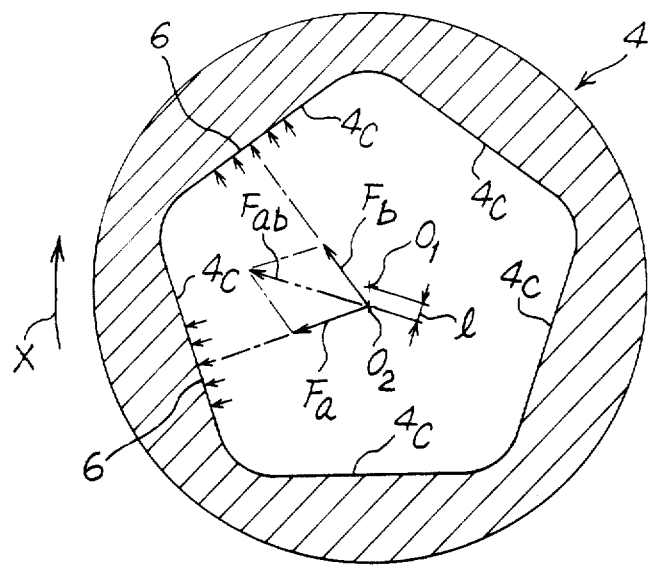
FIG. 4 is a transverse sectional view similar to FIG. 3, showing the casing only of the hydraulic motor for explanation of the operation of the motor.

The actuator as shown in FIGS. 1 to 4 operates in the following manner. When a high pressure fluid is supplied through, say, the first fluid passage 14 into the two spaces 9 below the pistons 5 in the first area A, the high fluid pressure is introduced through the axial bores 18 of the pistons into the two static pressure bearings 6 across the pistons in the first area A, whereupon two forces Fa and Fb whose lines of action pass the eccentric axis $0_2$ are produced so as to act on the inner flat surface sections 4c of the casing 4 of the hydraulic motor 1 perpendicularly thereto. The resultant force Fab of the two forces Fa and Fb then has a line of action passing the eccentric axis $0_2$ and being disposed a distance l from the axis $0_1$ of the shaft 3 as shown in FIG. 4. As a result, the casing 4 of the hydraulic motor 1 is rotated about the axis $0_1$ clockwise in the direction of the arrow X by a moment of $|Fab| \times l$ acting on the motor casing.

As the motor casing 4 rotates, the capacity of each space 9 gradually increases in the first area A and decreases in the second area B, so that high pressure fluid flows through the first fluid passage 14 into the spaces 9 moving in the first area A while the fluid that has finished work in the spaces 9 moving in the second area B is discharged therefrom through the second fluid passage 15. The clockwise rotation of the motor casing 4 causes the elliptical cam 32 of the wave generator 25 to rotate in the same clockwise direction X, so that the diametrically opposite points a and b at which the external teeth 23 on the flexible spline 24 and the internal teeth 21 on the rigid circular spline 22 mesh with each other are displaced in the same direction X. Upon every one rotation of the elliptical cam 32 in the direction X, the flexible spline 24 rotates in the opposite direction indicated by an arrow Y in FIG. 2 for an angle corresponding to the difference between the number of the internal teeth 21 on the rigid spline 22 and that of the external teeth 23 on the flexible spline 24. The rotation of the flexible spline 24 is taken out through the output shaft 31. By controlling the direction and flow rate of the high pressure fluid supplied through the first or second fluid passage 14 or 15 it is possible to adjust the output torque of the shaft 31 to a desired value.

In the above operation, the electromagnetic brake 52 is kept inoperative by energizing the coil 38, which attracts the armature 35 thereby to keep the lining 36 away from the brake shoe 53. Under the condition, when the coil 38 is deenergized, the compression springs 37 push the armature 35 and the lining 36 thereon against the brake shoe 53 thereby to brake the hydraulic motor 1. By energizing or deenergizing the electromagnetic coil 38 it is possible to render the brake inoperative or operative.

The nonmagnetic stainless steel ring 39 interposed between the supporting disk 26 and the rigid circular spline 22 helps prevent dispersion or leakage of the magnetic flux produced by the energized coil 38. In other words, the ring 39 increases the amount of magnetic flux from the coil which advances toward the armature 35, that is to say, the amount of effective magnetic flux perpendicularly crossing the surface of the armature opposite to the electromagnetic coil 38. With this arrangement, a relatively small electromagnetic coil suffices for operation of the armature 35 so that the actuator can be made compact in size.

The nonmagnetic material of which the ring 39 is made can be any other suitable material than stainless steel such as, for example, brass and other nonferrous metals. The nonmagnetic ring 39 can be provided at any other position than in the illustrated embodiment, provided that the ring 39 effectively prevents the magnetic flux from bypassing the armature 35.

As is apparent from the foregoing description, when the electromagnetic coil 38 is energized, it produces a strong magnetic field around the coil, which tends to magnetize the supporting shaft 3 of the hydraulic motor 1. The magnetized shaft 3 attracts particles or dust of iron and/or other ferrous materials contained in the working fluid for the motor 1, so that the particles or dust on the surface of the shaft tend to intrude clearance gaps between the sliding surfaces of the component parts thereby to cause burning or other damages thereto.

Generally, the harmonic drive requires lubrication, and in the actuator of the present invention the chamber 30 contains lubricating oil, which tends to reduce the coefficient of friction ($\mu$) of the contacting surface of the brake shoe 53. If the force by which the armature 35 is pressed against the brake shoe 53 is F, the brake torque T is given as:

$$T = \mu \cdot F$$

In the above equation if the value $\mu$ becomes smaller, the pressing force F exerted by the springs 37 must be increased in order to keep the torque T unchanged. With the increased pressing force F, however, it is necessary to make stronger the magnetic force produced by the coil 38 in order to release the brake by overcoming the increased spring force, and in order to produce a stronger magnetic force the magnetic coil must be made larger, with resulting increase in the size of the actuator as a whole. Therefore, the magnetic flux produced by the coil must be utilized efficiently.

Figure 5:
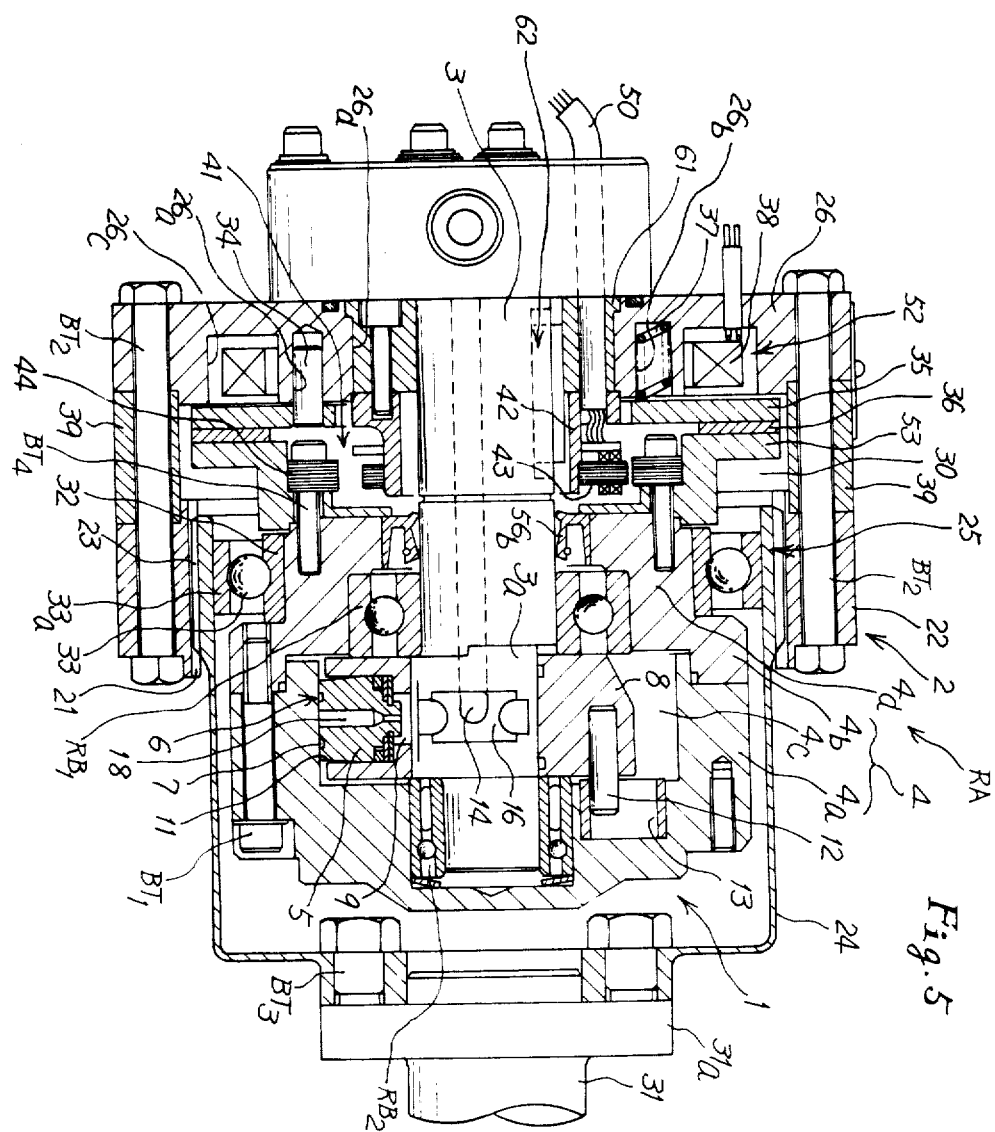
FIGS. 5 through 7 are vertical sectional views of different embodiments of the invention.

FIG. 5 shows another embodiment of the invention directed toward solving the above problem. In FIG. 5 the same reference symbols as in FIGS. 1 to 4 designate corresponding component parts so that no explanation of these parts will be required.

In the embodiment of FIG. 5 a bushing 61 made of a suitable nonmagnetic material such as stainless steel is interposed between the supporting disk 26 of the harmonic drive 26 and the supporting shaft 3 of the hydraulic motor 1. In particular, the bushing 61 is fitted in the central hole 26d formed in the disk 26, and the shaft 3 has its left end portion inserted into the bushing 61 and keyed to it as at 62. It is obvious that the bushing 61 effectively shields the shaft 3 from the magnetic field produced by the electromagnetic coil 38. The shield 61 and the ring 39 help make efficient use of the magnetic field produced by the coil 38 for attraction of the armature 35.

The bushing 61 may be of any other suitable shape or structure and the material of the bushing may be any other nonmagnetic material than stainless steel, such as brass or other nonferrous metals.

Figure 6:
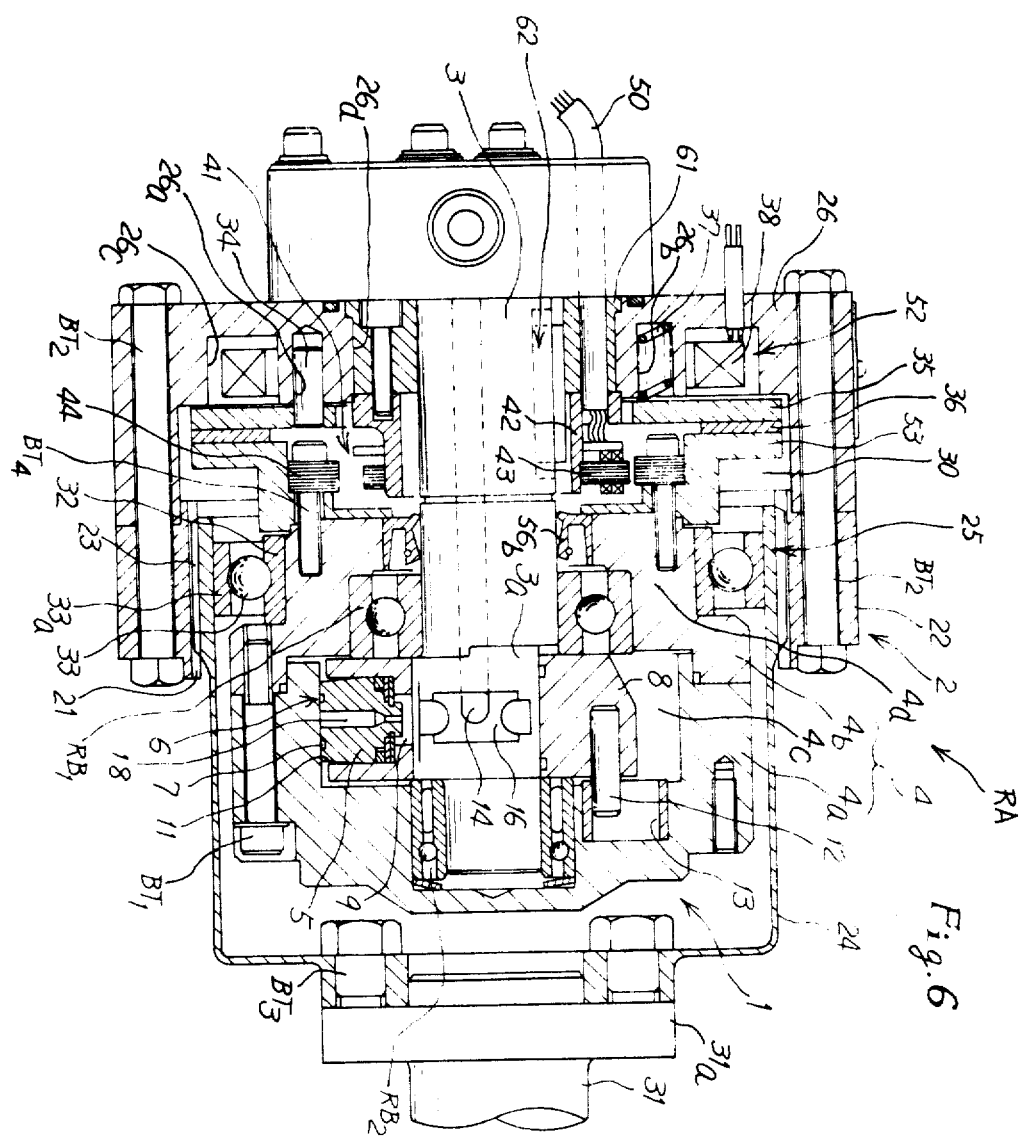

FIG. 6 shows a modified construction of FIG. 5 without the nonmagnetic ring 39.

Figure 7:
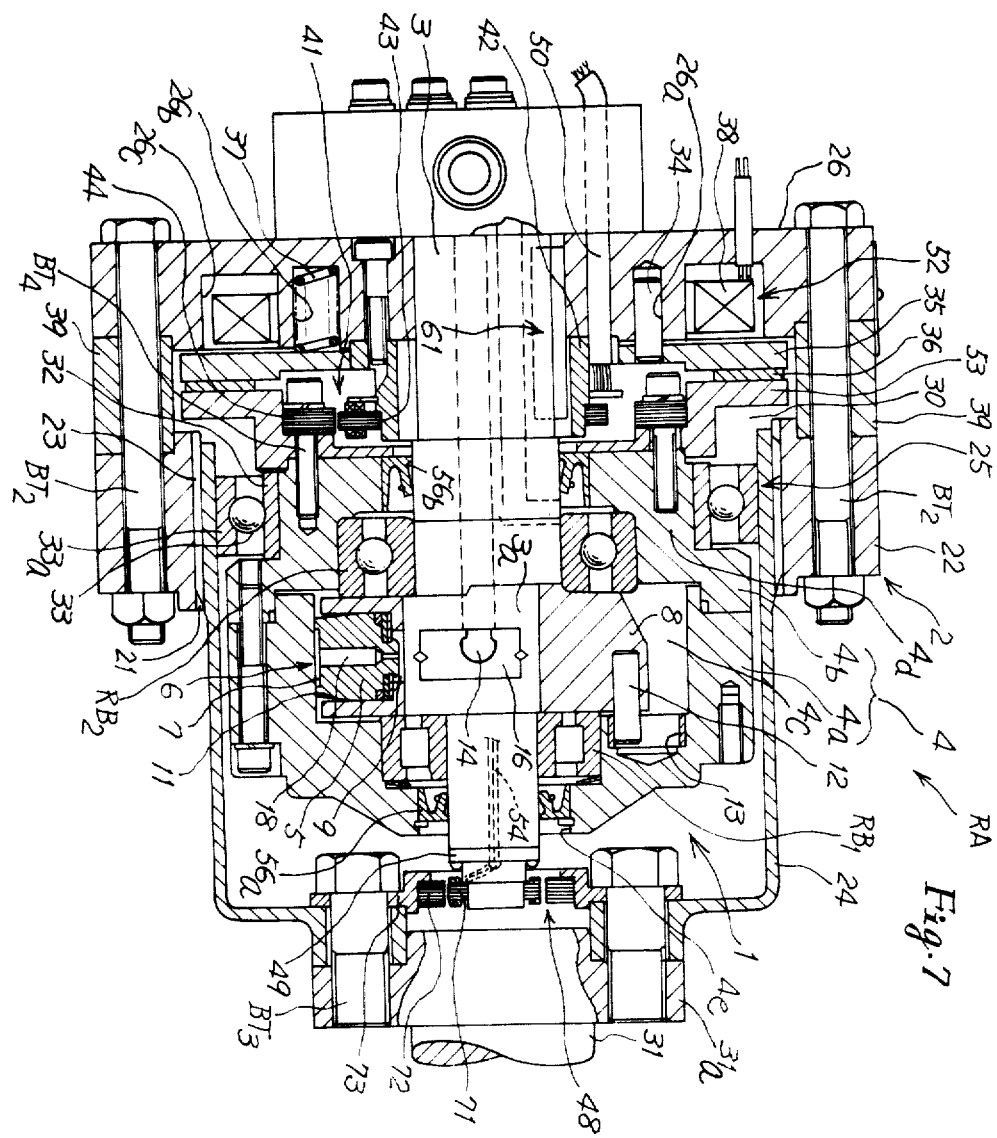
Figure 8:
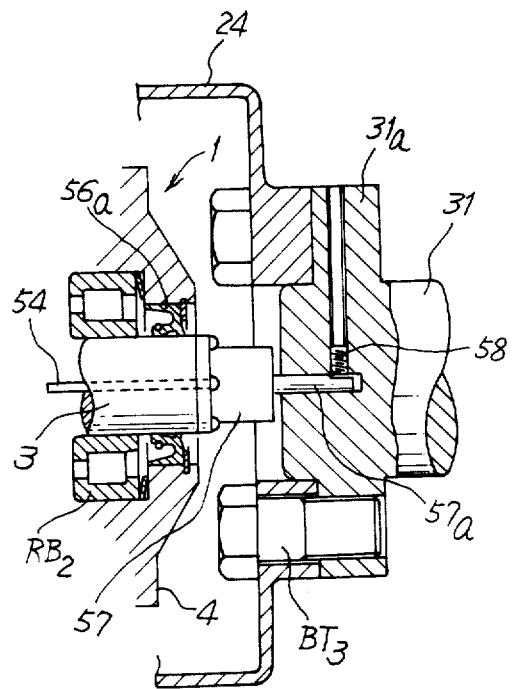
FIG. 8 is a vertical sectional view of a portion of FIG. 7 provided with the second rotation detector in a different form.

Turning now to FIG. 7, there is shown a fourth embodiment of the invention, which is provided with a first rotation detector 41 for detecting the angular position and speed of the hydraulic motor 1 relative to the stationary supporting shaft 3 and a second rotation detector 48 for detecting the angular position of the output shaft 31 relative to the stationary shaft 3.

Figure 9:
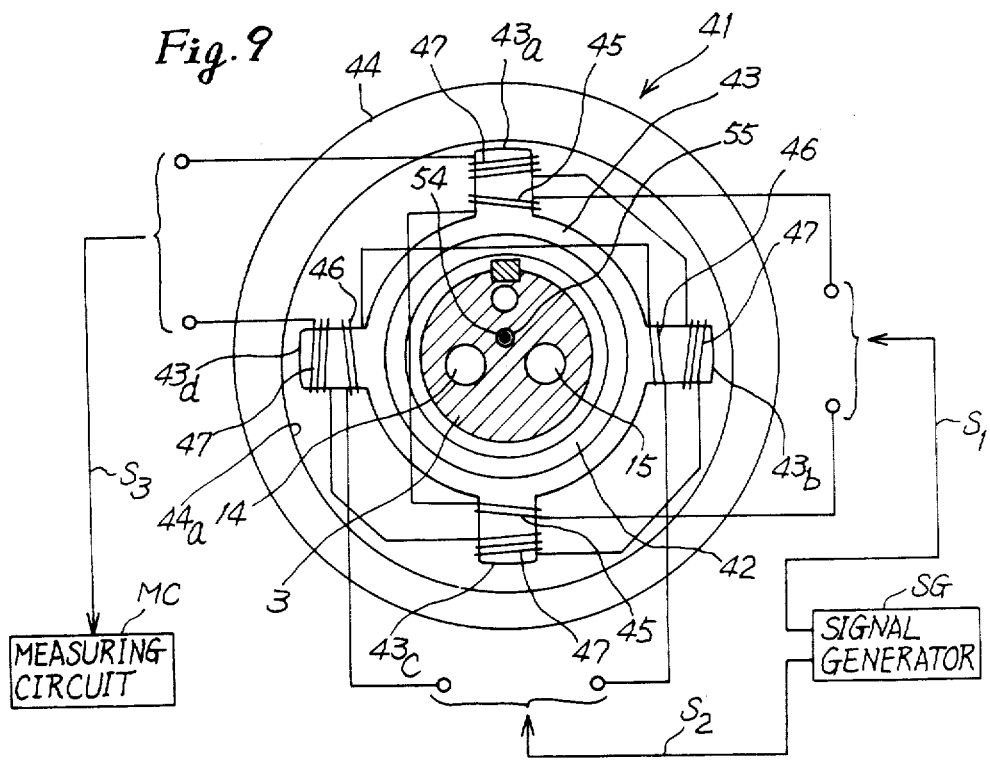
FIG. 9 is a schematic view for explanation of the operation of the rotation detector.

The first rotation detector 41 comprises a fixed supporting ring 42 surrounding the shaft 3 and projecting from the supporting disk 26 toward the lid member 4b of the motor casing 4, a stator 43 fitted externally on the periphery of the supporting ring 42 and an annular rotor 44 encircling the stator 43 and secured as at BT₄ to the lid member 4b of the motor casing 4 radially inwardly of the brake shoe 53. As schematically shown in FIG. 9, the stator 43 is formed on the periphery thereof with four poles 43a, 43b, 43c and 43d circumferentially spaced 90° apart from each other, and the radial distance between the outer end of each of the four poles 43a to 43d and the opposite point on the inner circumferential surface 44a of the rotor 44 varies sinusoidally as the rotor 44 is rotated. In particular, the inner circumferential surface 44a of the rotor 44 is circular and has an axis eccentric with respect to the axis of the stator 43.

Each of the diametrically opposite poles 43a and 43c is provided with a first primary winding 45 and each of the diametrically opposite poles 43b and 43d displaced 90° from the poles 43a and 43c is provided with a second primary winding 46. Each of the four poles 43a to 43d is provided with a secondary winding 47. The first pair of primary windings 45 are connected in series and so are the second pair of primary windings 46, while all of the four secondary windings 47 are connected in series.

A signal generator SG applies to the first series of primary windings 45 a first sinusoidal input signal $S_1$ and to the second series of primary windings 46 a second sinusoidal input signal $S_2$ whose phase is shifted 90° from the first signal $S_1$, so that the series circuit of the four secondary windings 47 produces an output signal $S_3$, from which the angular position of the rotor 44 relative to the stator 43 can be determined by a measuring circuit MC in the following manner.

The signal generator SG includes a quartz oscillator not shown which produces clock pulses exactly at 2.5 MHz and applies to the first series of primary windings 45 a first sinusoidal input signal $S_1$ produced by counting 2048 pulses and also to the second series of primary windings 46 a second sinusoidal input signal $S_2$ produced by the counter in a similar manner and shifted in phase exactly 90° from the first input signal $S_1$, so that the series circuit of secondary windings 47 produces an output signal $S_3$ whose phase is shifted from the first input signal $S_1$ by an angle $\theta$ whose magnitude is proportional to the angular or rotational position of the rotor 44. Therefore, by reading the count on the pulse counter at an instant Q when the output signal $S_3$ has become zero as it changes from the negative to the positive sign, it is possible to detect the phase difference $\theta$ between the input and output signals $S_1$ and $S_3$ and to know from the detected value $\theta$ the angular position of the rotor 44 and consequently that of the motor casing 4.

In the embodiment of FIG. 7, the supporting shaft 3 extends axially through a central hole 4e formed in the body 4a of the motor casing 4 with a seal ring 56a interposed between the outer circumferential surface of the shaft 3 and the central hole 4e formed in the casing body 4a.

The second rotation detector 48 comprises a supporting block 49 secured to the free axial end of the shaft 3 opposite to the end thereof secured to the supporting disk 26, a stator 71 fitted externally on the periphery of the supporting block 49, and a rotor 72 encircling the stator 71 and fitted internally on an annular supporting ring 73 secured to the closed axial end or bottom of the cup-shaped flexible spline 24. The structures and relative arrangement of the stator 71 and the rotor 72 are substantially the same as those of the stator 43 and the rotor 44 of the first rotation detector 41, so that the second rotation detector 48 operates on substantially the same principle as the first rotation detector 41 and can detect the angular position of the output shaft 31 relative to the stationary shaft 3 of the hydraulic motor 4.

The windings of the stator 71 are connected to a shielded cable 54, which extends through an axial bore 55 (FIG. 9) formed in the stationary shaft 3 and comes outside for connection to a measuring unit. The tip member 49 and the annular supporting member 73 are made of stainless steel or a suitable nonferrous metal such as brass so as to prevent disturbance and obtain accurate detection signals.

The seal rings 56a and 56b help prevent mixing of the working fluid in the hydraulic motor 1 and the lubricating oil in the chamber 30 enclosing the motor.

As the motor 1 is operated to rotate the casing 4, the rotor 44 of the first detector 41 is rotated so that the rotational position of the casing 4 can be detected in the previously mentioned manner. It is possible to obtain a position signal corresponding to a very minute angle such as for example one-several hundredth of one rotation of the casing 4, that is, 360°. Since the detector 41 is so arranged as to detect the rotational angle by utilizing magnetism, exposure of the component parts to lubricating oil or working fluid does not result in deterioration of the performance of the actuator, provided that the windings on the stator poles 43a to 43d and the terminals of the windings connected to the shielded cable 50 are sealed or covered with resinous material.

As the motor 1 is rotated, the flexible spline 24 is also rotated together with the output shaft 31, with the rotor 72 of the second rotation detector 48 being rotated simultaneously, so that the rotational position of the output shaft 31 can be detected in the previously described manner. It is possible to obtain a position signal corresponding to a very minute angle such as one-several hundredth of one complete rotation of the output shaft 31, that is, 360°. Since the second rotation detector 48 is also so designed as to detect the rotational angle by utilizing magnetism, exposure of the component parts to lubricating oil or working fluid does not result in deterioration of the performance of the actuator, provided that the windings of the second rotation detector and the terminals thereof connected to the shilded cable 54 are sealed or covered with resinous material.

Since the rotor 72 is supported by the connected portion of the flexible spline 24 to the output shaft 31, it is possible to obtain a stable position signal without the influence of lost motion of the component parts or the spring constant of the material of the flexible spline 24.

In a known actuator of a similar type the rotation of the output shaft is transmitted to a rotation detector through a feedback gearing, so that the backlash of the gears tends to deteriorate the sensitivity of detection. This defect can be eliminated by the arrangement of the present invention that the second rotation detector 48 directly detects the rotation of the output shaft 31.

In the arrangement of FIG. 7, since an absolute position signal can be obtained at both the input and output sides of the actuator, if the power supply fails, prompt restoration of the position can be effected, provided that the position is memorized beforehand.

Since the two absolute signals enable accurate and precise detection of position, it is possible to determine the position of an arm or like component of a robot connected to the output shaft 31 with a high degree of accuracy and precision.

Since the absolute signal can be used incrementally, it is possible to determine the position by two types of signals, that is, the speed detection signal and the position detection signal.

Although the harmonic drive involves lost motion, it has a good reproducibility under the condition that the load is in the same direction and the output torque depends upon the spring constant of the material of the flexible spline 24, so that it is possible to determine position with a high degree of accuracy and precision by adjusting the spring constant and the input pressure of the hydraulic motor 1 correlatively. By using a control system in which the above adjustment has been incorporated it is possible to memorize the position signal accurately when an accident such as failure of the power supply happens, thereby to enable easy restoration of the position.

Figure 10:
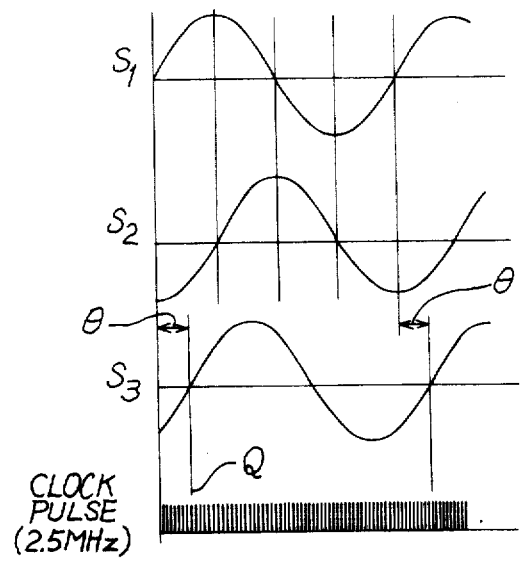
FIG. 10 is a graph for explanation of the operation of the detector.

In FIG. 10, the second rotation detector 48 shown in FIG. 7 is replaced by a different type of detector which employs a potentiometer 57 for detection of the angular position of the output shaft 31 relative to the supporting shaft 3. The potentiometer 57 has an axial rod 57a fixed to the output shaft 31 by a set screw 58 for simultaneous rotation therewith. The rod 57a has a radial arm (not shown) in slidable contact with a resistor (not shown) fixed to the support shaft 3.

The potentiometer 57 may be replaced by a synchro resolver, a differential transformer, an electrostatic voltage counter, an inductosyn, and other suitable devices.

The first rotation detector 41 in FIGS. 1, 5, 6 and 7 may also be replaced by any other suitable type of detector.

The hydraulic motor 1 may also be replaced by any other suitable type of hydraulic motor.

The hydraulic rotary actuator constructed in accordance with the present invention has various advantages such as follows.

Since the driving force of the hydraulic motor is taken out through a harmonic drive, it is possible to obtain a high output torque. Since the hydraulic motor is enclosed in a chamber 30 formed in the harmonic drive, with the wave generator 25 being fitted on the motor casing 4, space can be reduced, so that the actuator can be made compact in size and light in weight.

Since the actuator is provided with an electromagnetic brake enclosed in the motor chamber, rotation of the motor casing can be stopped by operating the brake, so that it is possible to stop the member under control, e.g. the arm of a robot connected to the output shaft 31 of the actuator instantly and accurately at a required position against the force of inertia, or to prevent uncontrolled overrunning of the member under control at power failure.

Since the nonmagnetic ring 39 provided adjacent the electromagnetic coil of the electromagnetic brake helps strengthen the effective magnetic flux acting on the armature 35, it is possible to make the coil smaller in size without deteriorating the performance of the brake, so that the actuator can be made compact in size despite the electromagnetic brake 52 being enclosed therein.

The magnetic shield 61 of nonmagnetic material interposed between the coil 38 of the electromagnetic brake 52 and the supporting shaft 3 of the hydraulic motor 1 prevents those damages which would be caused to the component parts of the hydraulic motor and the harmonic drive if the shaft had been magnetized. The magnetic shield also cooperates with the above-mentioned nonmagnetic ring 39 to increase the effective magnetic force acting on the armature 35.

In the embodiment of FIG. 7, since both the first and the second rotation detectors 41 and 48 are enclosed in the chamber 30 of the actuator, it is not necessary to provide any rotation detector outside the machine casing, so that the system as a whole can be made compact. Moreover, since the state of rotation can be detected at both the input side and the output side without ever using any feedback gearing, it is possible to attain a high degree of accuracy and precision in determination of position and at the same time to guarantee prompt and exact restoration in case of power failure.

The hydraulic rotary actuator of this invention provided with the hydraulic motor of the illustrated construction is particularly suitable for use in an intelligent robot used for assembling parts. In particular, since no such moment is exerted on any of the pistons of the hydraulic motor as to cause tilting or inclination of the axis of each piston relative to the axis of the corresponding cylinder bore, it is possible to keep a high mechanical efficiency even when there is only a small difference between the inlet and outlet pressures of the motor, so that good matching between the actuator and a servo valve can be effected. Also, since there is no such tilting moment as mentioned above exerted on the pistons of the hydraulic motor, a proper pressure balance is established between the eccentric portion 3a of the shaft 3 and the cylinder block 8 of the hydraulic motor 1, so that an effective seal between the component parts and consequently a high volumetric efficiency can be maintained even when the motor is being operated at a low speed.

Additionally, the hydraulic motor 1 has its main component parts arranged in well-balanced condition about its axis $0_1$ of rotation and has no such rotating eccentric shaft as is provided in some conventional hydraulic motors, so that it is possible to run the motor within a wide range of speed from a lower to a higher speed than has been possible with conventional hydraulic motors.

The hydraulic rotary actuator of the present invention is composed of a hydraulic motor of the above-mentioned characteristics and a harmonic drive which has a high mechanical efficiency, a high output torque and a high degree of accuracy and precision in determining the position of the output shaft despite the torsional force from the load, so that the actuator is compact in size, light in weight, capable of producing a high output torque, operable within a wide range of speed with a high degree of precision, has good matching with a servo valve and the like, and is particularly suitable for use in various types of robots.

What we claim is:

1. A hydraulic rotary actuator comprising:
   (a) a harmonic drive comprising a generally hollow cylindrical rigid circular spline closed at one axial end by a supporting member and open at the opposite end, with internal teeth formed on said open axial end portion of said rigid spline, a generally cup-shaped flexible spline having external teeth on one axial end thereof and an output shaft fixed to the opposite axial end thereof so as to extend in the axial direction opposite to said one axial end, said flexible spline having said one axial portion inserted into said opposite axial end portion of said rigid circular spline so that said rigid and flexible splines define a closed chamber, and a wave generator so arranged in said chamber as to act on said flexible spline to cause partial engagement of said external and internal teeth;
   (b) a hydraulic motor of a radial piston type arranged in said chamber, and having a rotatable motor casing the axial end portion of which has an elliptical circumference with said wave generator being mounted on said elliptical end portion of said hydraulic motor casing so that as said motor is rotated, said wave generator causes the points of engagement of said internal and external teeth of said two splines to be displaced circumferentially;
   (c) a detector so arranged in said chamber in associated with said hydraulic motor as to detect the angular position or speed of said hydraulic motor relative to said rigid circular spline; and
   (d) an electromagnetic brake so arranged in said chamber as to act on said hydraulic motor.

2. The actuator of claim 1, further including means associated with said electromagnetic brake for increasing the effective working magnetic flux of said electromagnetic brake.

3. A hydraulic rotary actuator comprising:
   (a) a harmonic drive comprising a generally hollow cylindrical rigid circular spline closed at one axial end by a supporting member and open at the opposite end, with internal teeth formed on said open axial end portion of said rigid spline, a generally cup-shaped flexible spline having external teeth on one axial end thereof and an output shaft fixed to the opposite axial end thereof so as to extend in the axial direction opposite to said one axial end, with flexible spline having said one axial portion inserted into said opposite axial end portion of said rigid circular spline so that said rigid and flexible splines define a closed chamber, and a wave generator so arranged in said chamber as to act on said flexible spline to cause partial engagement of said external and internal teeth;

(b) a hydraulic motor of a radial piston type arranged in said chamber, and having a rotatable motor casing the axial end portion of which has an elliptical circumference with said wave generator being mounted on said elliptical end portion of said hydraulic motor casing so that as said motor is rotated, said wave generator causes the points of engagement of said internal and external teeth of said two splines to be displaced circumferentially;

(c) a detector so arranged in said chamber in associated with said hydraulic motor as to detect the angular position or speed of said hydraulic motor relative to said rigid circular spline said detector comprises: a stator fixed to said supporting member of said rigid circular spline about said shaft and having a plurality of radially outwardly extending poles provided with primary and secondary windings; a rotor fixed to said casing of said hydraulic motor for simultaneous rotation therewith, said stator and rotor being so arranged relative to each other that the distance between said rotor and each of said stator poles varies sinusoidally as said rotor is rotated; means for applying a sinusoidaly input signal to said primary windings so that a corresponding sinusoidal output signal shifted in phase from said input signal is produced by said secondary windings; and means for detecting the phase difference between said input and output signals thereby to detect the angular position or speed of said rotor relative to said stator; and (d) an electromagnetic brake so arranged in said chamber as to act on said hydraulic motor.

4. The actuator of claim 3, further including a second detector so arranged in said chamber in association with said flexible spline as to detect the angular position of said output shaft fixed to said flexible spline relative to said stationary supporting shaft of said hydraulic motor.

5. The actuator of claim 4, wherein said second detector comprises: a stator fixed to said stationary shaft of said motor and having a plurality of radially outwardly extending poles provided with primary and secondary windings; a rotor fixed to said output shaft for simultaneous rotation therewith, said stator and rotor being so arranged relative to each other that the distance between said rotor and each of said stator poles varies sinusoidally as said rotor is rotated; means for applying a sinusoidal input signal to said primary windings so that a corresponding sinusoidal output signal shifted in phase from said input signal is produced by said secondary windings; and means for detecting the phase difference between said input and output signals thereby to detect the angular position of said rotor relative to said stator.

6. The actuator of claim 4, further including means for increasing the effective working magnetic flux of said electromagnetic brake.

7. The actuator of claim 6, further including means for shielding said stationary shaft of said hydraulic motor from said magnetic flux produced by said electromagnetic brake.

8. A hydraulic rotary actuator comprising:

(a) a harmonic drive comprising a generally hollow cylindrical rigid circular spline closed at one axial end by a supporting member and open at the opposite end, with internal teeth formed on said open axial end portion of said rigid spline, a generally cup-shaped flexible spline having external teeth on one axial end thereof and an output shaft fixed to the opposite axial end thereof so as to extend in the axial direction opposite to said one axial end, said flexible spline having said one axial portion inserted into said opposite axial end portion of said rigid circular spline so that said rigid and flexible splines define a closed chamber, and a wave generator so arranged in said chamber as to act on said flexible spline to cause partial engagement of said external and internal teeth;

(b) a hydraulic motor of a radial piston type ararnged in said chamber, and having a rotatable motor casing the axial end portion of which has an elliptical circumference with said wave generator being mounted on said elliptical end portion of said hydraulic motor casing so that as said motor is rotated, said hydraulic motor comprising a stationary supporting shaft having one axial end thereof fixed to said supporting member of said rigid spline and axially extending a substantial axial distance within said chamber, with an eccentric portion formed on said shaft; a casing rotatably mounted on said stationary shaft; a cylinder block enclosed in said motor casing and mounted on said eccentric portion of said shaft for simultaneous rotation with said motor casing; a plurality of cylinder bores formed in said cylinder block radially about said eccentric axis; a plurality of pistons each having an axial through bore and being slidably fitted in one of said cylinder bores; first passage means for supplying working pressure fluid selectively to said cylinder bores to act through said axial bores of said pistons on said motor casing thereby to produce a torque to rotate said casing about the axis of said shaft; and second passage means for removing said pressure fluid that has finished work from said cylinder bores; said wave generator causes the points of engagement of said internal and external teeth of said two splines to be displaced circumferentially;

(c) a detector so arranged in said chamber in associated with said hydraulic motor as to detect the angular position or speed of said hydraulic motor relative to said rigid circular spline; and (d) an electromagnetic brake so arranged in said chamber as to act on said hydraulic motor, means for shielding said stationary supporting shaft of said hydraulic motor from said magnetic flux produced by said electromagnetic brake.

9. The actuator of claim 8, wherein said shielding means comprises a bush-like member of nonmagnetic material surrounding said one axial end portion of said stationary shaft of said hydraulic motor and interposed between said axial end portion of said stationary shaft and said electromagnetic brake.

10. The actuator of claim 8, further including means for increasing the effective working magnetic flux of said electromagnetic brake.

11. A hydraulic rotary actuator comprising:

(a) a harmonic drive comprising a generally hollow cylindrical rigid circular spline closed at one axial end by a supporting member and open at the opposite end, with internal teeth formed on said open axial end portion of said rigid spline, a generally cup-shaped flexible spline having external teeth on one axial end thereof and an output shaft fixed to the opposite axial end thereof so as to extend in the axial direction opposite to said one axial end, said flexible spline having said one axial portion inserted into said opposite axial end portion of said rigid circular spline so that said rigid and flexible splines define a closed chamber, and a wave generator so arranged in said chamber as to act on said flexible spline to cause partial engagement of said external and internal teeth;

(b) a hydraulic motor of a radial piston type ararnged in said chamber, and having a rotatable motor casing the axial end portion of which has an elliptical circumference with said wave generator being mounted on said elliptical end portion of said hydraulic motor casing so that as said motor is rotated, said wave generator causes the points of engagement of said internal and external teeth of said two splines to be displaced circumferentially;

(c) a detector so arranged in said chamber in associated with said hydraulic motor as to detect the angular position or speed of said hydraulic motor relative to said rigid circular spline; and (d) an electromagnetic brake so arranged in said chamber as to act on said hydraulic motor, said electromagnetic brake comprises: a generally annular brake shoe fixed to said hydraulic motor about said supporting shaft thereof; an armature of a magnetic material arranged about said supporting shaft and so supported by said supporting member of said rigid circular spline as to be axially movable relative to said brake shoe; an electromagnetic coil mounted on said supporting member about said supporting shaft in controlling relation to said armature; means for urging said armature into frictional contact with said brake shoe thereby to brake said hydraulic motor; and means for energizing said electromagnetic coil to produce a magnetic flux to move said armature axially out of frictional contact with said brake shoe thereby to free said hydraulic motor; and wherein said means for increasing said effective magnetic flux of said electromagnetic brake comprises a member of a nonmagnetic material so arranged adjacent said electromagnetic coil as to prevent said magnetic flux produced by said electromagnetic coil from bypassing said armature, and (e) means associated with said electromagnetic brake for increasing the effective working magnetic flux of said electromagnetic brake.

* * * * *